US012755314B2

(12) United States Patent
Ortega

(10) Patent No.: US 12,755,314 B2
(45) Date of Patent: Oct. 6, 2026

(54) SYSTEM AND METHOD FOR CONDUCTING COMMERCE THROUGH A VIRTUAL STORE USING ASSIGNED UNIQUE IDENTIFIERS

(71) Applicant: OMEGA ORTEGA, New York, NY (US)

(72) Inventor: Thomas Ortega, New York, NY (US)

(73) Assignee: OMEGA ORTEGA, New York, NY (US)

( * ) Notice: Subject to any disclaimer, the term of this patent is extended or adjusted under 35 U.S.C. 154(b) by 0 days.

(21) Appl. No.: 18/566,070

(22) PCT Filed: May 31, 2022

(86) PCT No.: PCT/US2022/031599
§ 371 (c)(1),
(2) Date: Nov. 30, 2023

(87) PCT Pub. No.: WO2022/256323
PCT Pub. Date: Dec. 8, 2022

(65) Prior Publication Data

US 2024/0273616 A1 Aug. 15, 2024

Related U.S. Application Data

(60) Provisional application No. 63/195,272, filed on Jun. 1, 2021.

(51) Int. Cl.
*G06Q 30/0601* (2023.01)
*G06F 3/0488* (2022.01)
(Continued)

(52) U.S. Cl.
CPC ....... *G06Q 30/0641* (2013.01); *G06F 3/0488* (2013.01); *G06F 16/955* (2019.01); *G06Q 20/12* (2013.01)

(58) Field of Classification Search
CPC ...... G06Q 30/0601–0644; G06Q 30/08; G06F 16/95; G06F 16/954; G06F 16/955–9566
See application file for complete search history.

(56) References Cited

U.S. PATENT DOCUMENTS 8,606,645 B1 12/2013 Applefeld
2007/0239552 A1 10/2007 Sundaresan
(Continued)

FOREIGN PATENT DOCUMENTS

WO 2017019698 A1 2/2017

OTHER PUBLICATIONS

9 Tools to Sell Products on Instagram. Aug. 13, 2018. Sig Ueland. https://www.practicalecommerce.com/7-Tools-for-Instagram-to-Sell-Products (Year: 2018).*
(Continued)

*Primary Examiner* — William J Allen
(74) *Attorney, Agent, or Firm* — Adler Pollock & Sheehan P.C.

(57) ABSTRACT

A method for developing a virtual store for one or more items to be listed for sale on the virtual store. Steps may include: selecting a visible representation that includes the item, assigning a first unique identifier to the selected visible representation, saving the selected visible representation in association with the first assigned unique identifier, selecting from the visible representation one or more items to be listed for sale, assigning a second unique identifier to the one or more items to be listed for sale, associating, by the seller, at least pricing with the one or more items to be listed for sale, identifying one or more payment options, assigning a third unique identifier for the one or more payment options, saving as an associated group at least the visible representation, the pricing, the payment options, and the first, second and third unique identifiers, wherein the associated group
(Continued)

represents a virtual store, and developing a uniform resource locator (URL) for the virtual store. The virtual store is displayed upon selection of the URL.

16 Claims, 7 Drawing Sheets

(51) Int. Cl.
*G06F 16/955* (2019.01)
*G06Q 20/12* (2012.01)

(56) References Cited

U.S. PATENT DOCUMENTS

| | | | | |
|---|---|---|---|---|
| 2009/0100076 | A1 | 4/2009 | Hamilton et al. | |
| 2010/0185547 | A1* | 7/2010 | Scholar | G06Q 50/188<br>707/754 |
| 2011/0082735 | A1 | 4/2011 | Kannan et al. | |
| 2011/0161182 | A1* | 6/2011 | Racco | G06Q 30/0277<br>705/26.1 |
| 2014/0019281 | A1* | 1/2014 | O'Dell | G06Q 30/0643<br>705/26.1 |
| 2014/0180880 | A1* | 6/2014 | Godsey | G06Q 30/0641<br>705/27.1 |
| 2014/0258016 | A1* | 9/2014 | Hale | G06Q 30/08<br>705/26.7 |
| 2018/0130119 | A1* | 5/2018 | Korac | G06Q 30/0635 |
| 2019/0122269 | A1 | 4/2019 | Pugazhendhi et al. | |
| 2020/0184437 | A1 | 6/2020 | Kelly et al. | |
| 2021/0082037 | A1* | 3/2021 | Oh | G06F 16/906 |
| 2021/0117071 | A1 | 4/2021 | Gharpuray | |

OTHER PUBLICATIONS

"International Search Report and Written Opinion received for PCT Patent Application No. PCT/US2022/031599, mailed on Sep. 8, 2022", 10 pages.

* cited by examiner

SYSTEM AND METHOD FOR CONDUCTING COMMERCE THROUGH A VIRTUAL STORE USING ASSIGNED UNIQUE IDENTIFIERS

CROSS REFERENCE TO RELATED APPLICATION

This application is a National Phase filing under 35 U.S.C § 371 of International Application No. PCT/US2022/031599 filed May 31, 2022, which claims benefit from U.S. Provisional Patent Application No. 63/195,272, filed Jun. 1, 2021, each of which is incorporated herein by reference in their entirety.

BACKGROUND

This disclosure relates to simplified commerce conducted using a mobile computing device.

Electronic commerce (e-commerce) is typically conducted via websites. Establishing an e-commerce website can be technically difficult and time consuming for sellers. The configurations of the store itself is also typically difficult comprising of three parts: application (website, app) wherein users conduct their activities (logging in, adding to cart), a middle tier application (web services) wherein most of the business logic for the store/shopping rules exist and are applied plus various authentication services to verify identity, and a series of backend servers (database servers, image servers) to associate store activity to users.

SUMMARY

Aspects and examples are directed to a system and method for developing a virtual store for an item to be listed for sale on the virtual store. The seller selects an image, video, or scene that includes the item. A software application or app running on a mobile computing device assigns a unique identifier (e.g., a UUID) to the selection, and automatically saves the image, video, or scene and the assigned UUID. The seller selects one or more items to be listed for sale, associates details with the selected items (e.g., price, quantity, description and the like), and identifies payment options. This is saved locally to the computing device and to a server (e.g., a cloud server such as those available from Amazon Web Services (AWS)). The app then automatically creates the virtual store and develops a URL for the virtual store. The URL and the image, video, or scene are then made available to be provided to potential buyers of the items listed for sale. Buyers can purchase items simply by tapping them, entering a quantity, and selecting a payment method. The buyer does not enter payment information into the app. Rather, the seller's payment information is used to link to various payment providers (such as PayPal and Venmo).

The system and method allow commerce makers to create and launch a store entirely on their phone or other mobile computing device such as a tablet, or an AR/VR/XR device. No login or monthly fee is required. The store can be established by the seller selecting an image, drawing closed shapes around product(s) in the image that are to be offered for sale, assigning a price and/or other details as desired to each product, and selecting one or more payment methods. A URL and the image are then made available for sharing across any social media account, email, newsletter, or group chat, for example. The link can then be shared by both sellers and buyers. Users (buyers) can then load the store (with no login required), tap the items they want, checkout, and pay using the payment options provided by the seller. The commercial transaction takes place directly between the seller and buyer, no money is handled by the app.

The subject system and method introduce a whole new paradigm for shopping. There is no need for aisles/shelves, long product descriptions, multiple images per items, permanent stores, SKUs, inventory management, payment processing, user logins, and the like. Also, in terms of technology, the entire middle tier app business logic has been done away with. For the seller (the store) the app rethinks the concepts of a store by discarding all the traditional aspects mentioned above. For the buyer, the app makes buying as simple as tapping on an image, resulting in an extremely fast checkout flow.

The invention includes a software application ("app") that is configured to run on a mobile phone, a tablet, or an AR/VR/XR device. The app can be configured to run natively on the device. Using the native software development kits (SDKs), the app will create a simple user interface to create and display the application screens. Alternatively, the app could be a mobile web app or a cross-platform app.

In some examples, a seller workflow is as follows: To begin, after downloading/installing the app, a user opens the app. No login is required. The seller taps a "create a new store" button. This allows them to choose an object (such as an image, a video or an AR/VR/XR scene). The chosen object is assigned a Universally Unique Identifier (UUID). These are then saved locally on the device and in a cloud server. Once saved, the next screen allows the seller to choose what items to sell, or the software automatically detects and calls out item(s) to be sold in the picture. Such automation can be accomplished using known machine learning techniques to automatically detect images that match items from previous stores or from image libraries. The results of this analysis would drive object detection. Items can be chosen by allowing the user to draw closed shapes (e.g., squares) around the items. The regions contained within the squares become the default sale items of the image. By tapping the sale items in the picture, the user can enter details (such as numeric prices, quantity, description, etc.). Also, the user can set one or more criteria by which the virtual store will expire automatically, as explained in more detail below. Once all items have been created, all the sale items, with their corresponding details are saved in the cloud server. Finally, sellers can enter their preferred payment information (such as PayPal, Venmo, cash app, google pay, apple pay or even elect to receive payments in real life through local currency). Once entered, the seller taps a button to make the store live. The app then provides a link and image for the seller to use to share in emails, newsletters, social media posts, group chats or communication platforms like Slack and Discord, for example. The commercial buy-sell transaction takes place directly between the seller and buyer, without any involvement by the app provider. Accordingly, the app provider provides the storefront, but is not responsible for the commercial transactions, legal compliance, taxes, etc.

In some examples a buyer workflow is as follows: Individuals see a link in an email, newsletter, social media post, group chat or communication platform from a seller. Once they click the link they will be prompted to download the app if they do not have it. If previously installed or once installed, the app will open up the virtual store. The buyer can immediately tap an item they want and select a quantity. The app will convert those selections into items in their cart. Once all desired items are selected, the user then submits their order, chooses how they want to pay and takes any other necessary actions such as delivery information and the like. Payment then takes place separately between the buyer and the selected payment choice.

All examples and features mentioned below can be combined in any technically possible way.

In one aspect, a method for developing a virtual store for one or more items to be listed for sale on the virtual store includes selecting, by a seller of an item, a visible representation that includes the item, automatically, by a software application running on a mobile computing device, assigning a first unique identifier to the selected visible representation, automatically, by the software application running on the mobile computing device, saving, to a server, the selected visible representation in association with the first assigned unique identifier, selecting from the visible representation one or more items to be listed for sale, automatically, by the software application running on the mobile computing device, assigning a second unique identifier to the one or more items to be listed for sale, associating, by the seller, at least pricing with the one or more items to be listed for sale, identifying, by the seller, one or more payment options, automatically, by the software application running on the mobile computing device, assigning a third unique identifier for the one or more payment options, automatically, by the software application running on the mobile computing device, saving as an associated group, to the server, at least the visible representation, the pricing, the payment options, and the first, second and third unique identifiers, wherein the associated group represents a virtual store, and automatically, by the software application running on the mobile computing device, developing a uniform resource locator (URL) for the virtual store. The virtual store is displayed upon selection of the URL.

Some examples include one of the above and/or below features, or any combination thereof. In an example the method further comprises selecting, by the seller and before the selection of the visible representation, an option to create a new store. In an example selecting, by the seller, a visible representation that includes the item, comprises tapping an image, a video, or a scene, on a mobile computing device. In an example the scene comprises an augmented reality (AR) scene, a virtual reality (VR) scene, or an x reality (XR) scene. In an example selecting, by the seller, a visible representation that includes the item, comprises using a controller, or a hand or finger detection process. In an example the identifier comprises a Universally Unique Identifier (UUID).

Some examples include one of the above and/or below features, or any combination thereof. In an example selecting from the visible representation one or more items to be listed for sale is accomplished by the seller. In an example selecting from the visible representation one or more items to be listed for sale is accomplished by the seller tracing on a screen of a mobile computing device. In an example selecting from the visible representation one or more items to be listed for sale is accomplished by the seller tracing a closed shape on the mobile computing device screen. In an example the seller can select multiple separate items that are in the visible representation by tracing closed shapes around each of the multiple separate items. In an example associating, by the seller, pricing with the selected items comprises separately assigning prices to each of the multiple separate items.

Some examples include one of the above and/or below features, or any combination thereof. In an example selecting from the visible representation one or more items to be listed for sale is accomplished automatically by the app. In an example saving as an associated group, to the server, at least the visible representation, the pricing, the payment options, and the first, second, and third unique identifiers is initiated by the seller tapping an icon on a display of a mobile computing device. In an example the method further comprises choosing for purchase from the visible representation, by a purchaser, and after selection of the URL and display of the virtual store, an item listed for sale. In an example choosing an item for purchase comprises tapping, by the purchaser, a visible representation of the item on a display of a mobile computing device. In an example the method further comprises purchasing the item for purchase, by the purchaser, by selecting a payment option. In an example the method further comprises outputting, as an electronic display or a printout, a matrix barcode that when scanned is configured to cause the purchase of an item listed for sale. In an example the method further comprises enabling a potential purchaser of an item listed for sale to view multiple virtual stores from one or multiple vendors at the same time, each virtual store displaying one or more items listed for sale. In an example the method further comprises identifying, by the seller, a criterion by which the virtual store will automatically expire.

In another aspect, a method for developing a virtual store for one or more items to be listed for sale on the virtual store includes selecting, by a seller of an item, an option to create a new store, selecting, by the seller a visible representation that includes the item by tapping an image, a video, or a scene, on a mobile computing device, automatically, by a software application running on a mobile computing device, assigning a first unique identifier to the selected visible representation, automatically, by the software application running on the mobile computing device, saving, to a server, the selected visible representation in association with the first assigned unique identifier, selecting, by the seller tracing a closed shape on the mobile computing device screen, one or more items to be listed for sale, automatically, by the software application running on the mobile computing device, assigning a second unique identifier to the one or more items to be listed for sale, associating, by the seller, at least pricing with the one or more items to be listed for sale, identifying, by the seller, one or more payment options, automatically, by the software application running on the mobile computing device, assigning a third unique identifier for the one or more payment options, automatically, by the software application running on the mobile computing device and based on a user tapping an icon on the display of the mobile computing device, saving as an associated group, to the server, at least the visible representation, the pricing, the payment options, and the first, second and third unique identifiers, wherein the associated group represents a virtual store, automatically, by the software application running on the mobile computing device, developing a uniform resource locator (URL) for the virtual store, wherein the virtual store is displayed upon selection of the URL, choosing for purchase from the visible representation, by a purchaser, and after selection of the URL and display of the virtual store, an item listed for sale, wherein choosing an item for purchase comprises tapping, by the purchaser, a visible representation of the item on the display of the mobile computing device, and purchasing the item for purchase, by the purchaser selecting a payment option.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
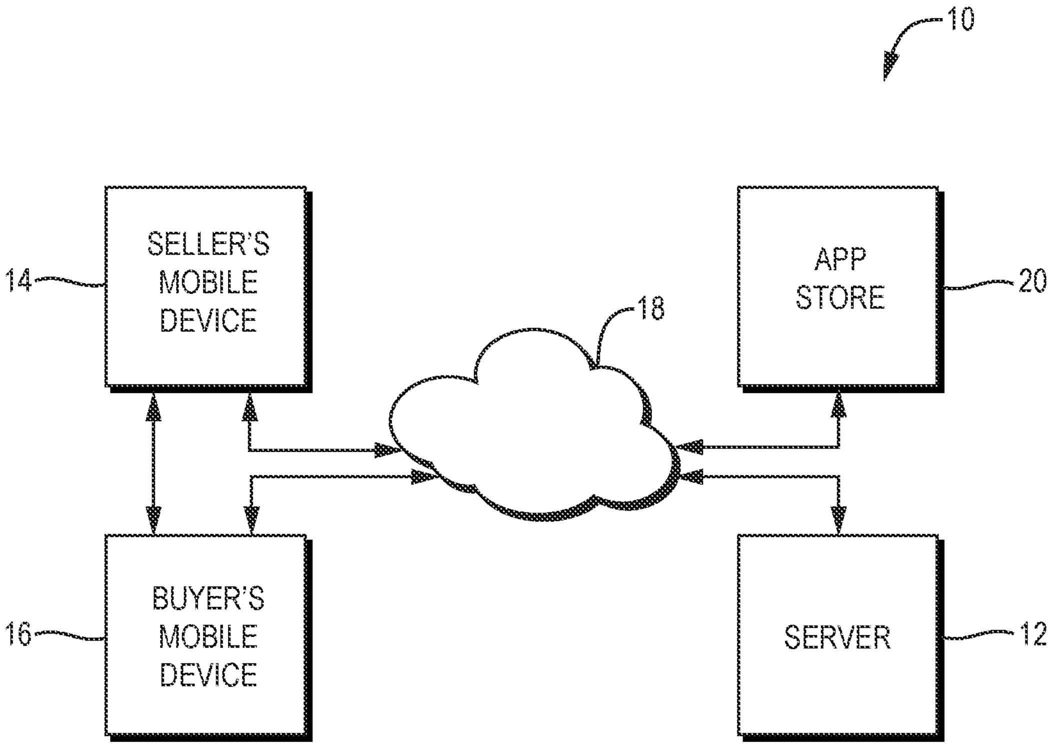
FIG. 1 is a block diagram of a system for conducting commerce with an app, and that can be used to accomplish the methods described herein.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

The inventive system and method allow sellers to create and launch a virtual store entirely on their device (e.g., smartphone, tablet, AR/VR/XR device). No login or monthly fee is required. The virtual store can be established by the seller simply selecting an image, drawing on the device screen or otherwise manipulating the device (e.g., using a finger, hand, or controller) closed shapes around one or more products in the image, assigning a price and other details to each product, then attaching preferred payment methods to the virtual store (e.g., to the UUID). This is saved in a cloud server. A URL and image are then made available for sharing across any social media account, email, newsletter, or group chat, for example. Users (buyers) can then load the virtual store (with no login required), tap the items they want, checkout, and pay using the payment options provided by the seller.

FIG. 1 is a block diagram of a system 10 for accomplishing streamlined commerce with an app, and that can be used to accomplish the methods described herein. In some examples the actions and steps described herein are accomplished in part by each of the seller's mobile device (e.g., smartphone) 14, the buyer's mobile device (e.g., smartphone) 16, a cloud-based sever 12, and as needed, an app store 20 that serves as a location for any user to obtain the app. All the devices/functionalities are enabled to communicate over cloud 18. The basic functionalities of each device are well known in the field. Accordingly, not all such basic functionalities are described herein. The actions described as undertaken by a seller can be accomplished using smartphone 14 loaded with the described app. The actions described as undertaken by a buyer can be accomplished using smartphone 16 loaded with the described app. The actions described as undertaken by the app in the creation of a virtual store can be accomplished by the app running on a mobile computing device 14. Some functionalities of the app are described elsewhere herein.

Figure 2:
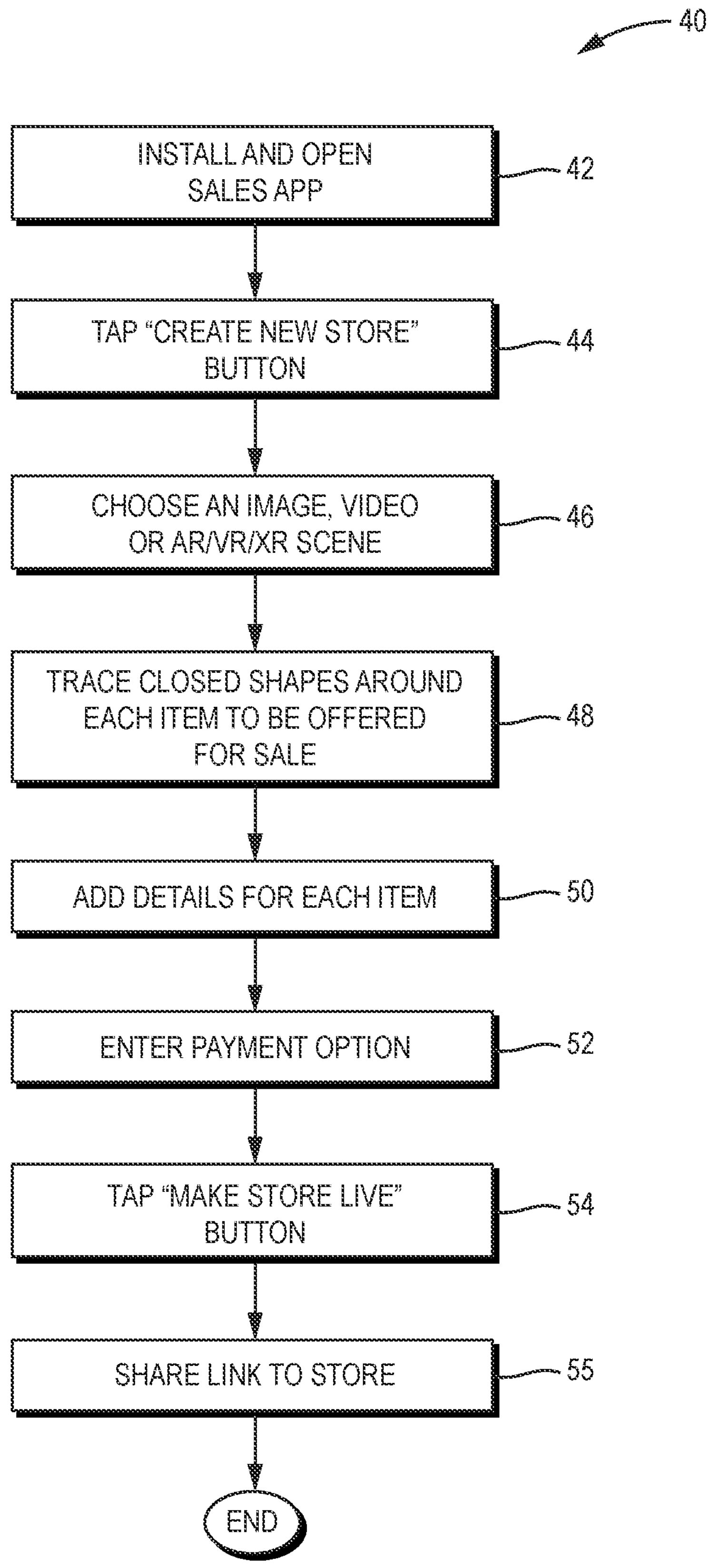
FIG. 2 is a flowchart of the seller's workflow.

FIG. 2 is a flowchart of the seller's workflow 40, accomplished using smartphone or equivalent mobile computing device 14. Device 14 needs to be able to communicate over the cloud with at least server 12, and needs to be touch-enabled, responsive to finger/hand motions (e.g., an AR/VR/XR headset) or responsive to a controller, mouse or other pointing device. If the seller has not used the sales app, it is installed and opened, step 42. If the seller already has the app, the seller opens it. In some examples the app is written in the native OS of the device, e.g., using software development kits (SDKs). Other types of apps, such as mobile web apps, could likewise be used. When the app is opened a screen is displayed that includes an icon such as a button that the seller can tap to create a new virtual store using the app, step 44. The screen will display an instruction to select an image, a video, or a scene, step 46 (the selected image, video, or scene is sometimes termed herein a "visible representation"). The screen will then display an instruction to draw or trace (e.g., using a finger on a touch-enabled display or in AR/VR/XR using hand/finger detection) a square or other closed shape around each item that is in the visible representation that the seller desires to offer for sale, step 48. The app causes the device display to render a line or border along the trace, so that the seller (and buyers) can distinguish among multiple items for sale in the visible representation. However, there can be only one item for sale, in which case step 48 would be skipped. The seller is then presented with an instruction to add details such as pricing, description, quantity and the like for each selected item, step 50. This can be done with a number pad display, a drop-down list, or by providing a blank to be filled in by the seller after tapping each item. In an alternative example the app can employ machine learning to recognize an item being sold, in which case some or all details can be pre-populated. For example, if the seller has previously sold the same item the app can recognize that and automatically fill in the item details (which could then be altered by the seller as desired). The seller is then prompted to enter payment options, step 52. The newly-created virtual store is then made live by tapping a "make store live" button, step 54. The app is then enabled to share a link to the store (e.g., a URL that the app creates), step 55. If the seller already has a store, the seller can add items to the store by first selecting a store (if there are multiple stores), and following process 40 beginning at step 46. Note that while the steps are illustrated in a particular order, the order of the steps can be changed or mixed. For example, a store could be opened first, the payment information added, pricing and details added, and the like. Or, the seller could start with payment information, open the store, add image and items, and the like. Or, since information is saved locally and to the cloud during the store opening process the process can be abandoned at any point and picked back up later, despite not having a login.

In some examples the virtual store can be set to automatically expire or close based on one or more criteria. In an example the app automatically causes stores to expire on midnight the day after it is first opened (or at any other time as established in the app, for example stores could be open for 24 hours by default). Also, in some examples the user is allowed to select store closure criteria, which commonly are based on quantities sold, quantities ordered, or a certain date/time.

Figure 3:
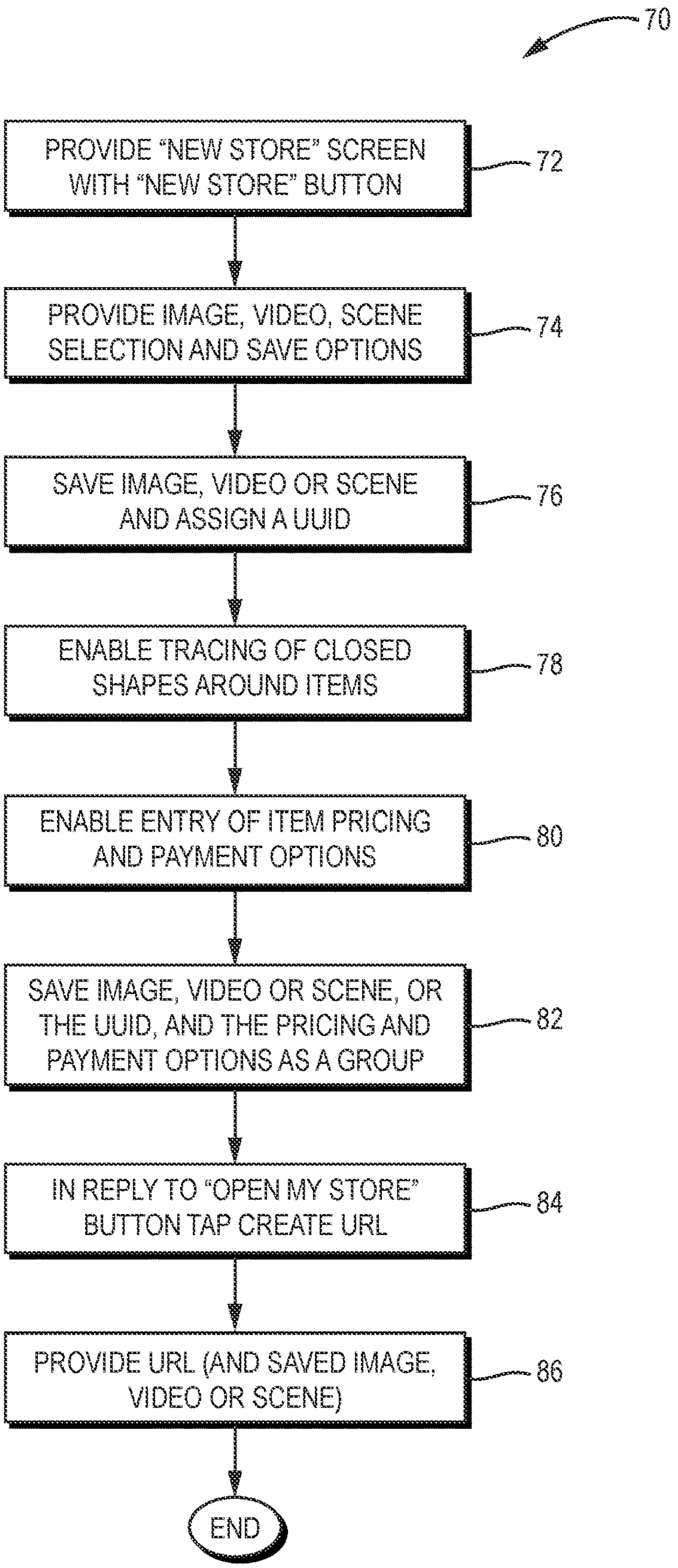
FIG. 3 is a flowchart of operation of the application logic associated with the creation of a virtual store.
Figure 4A:
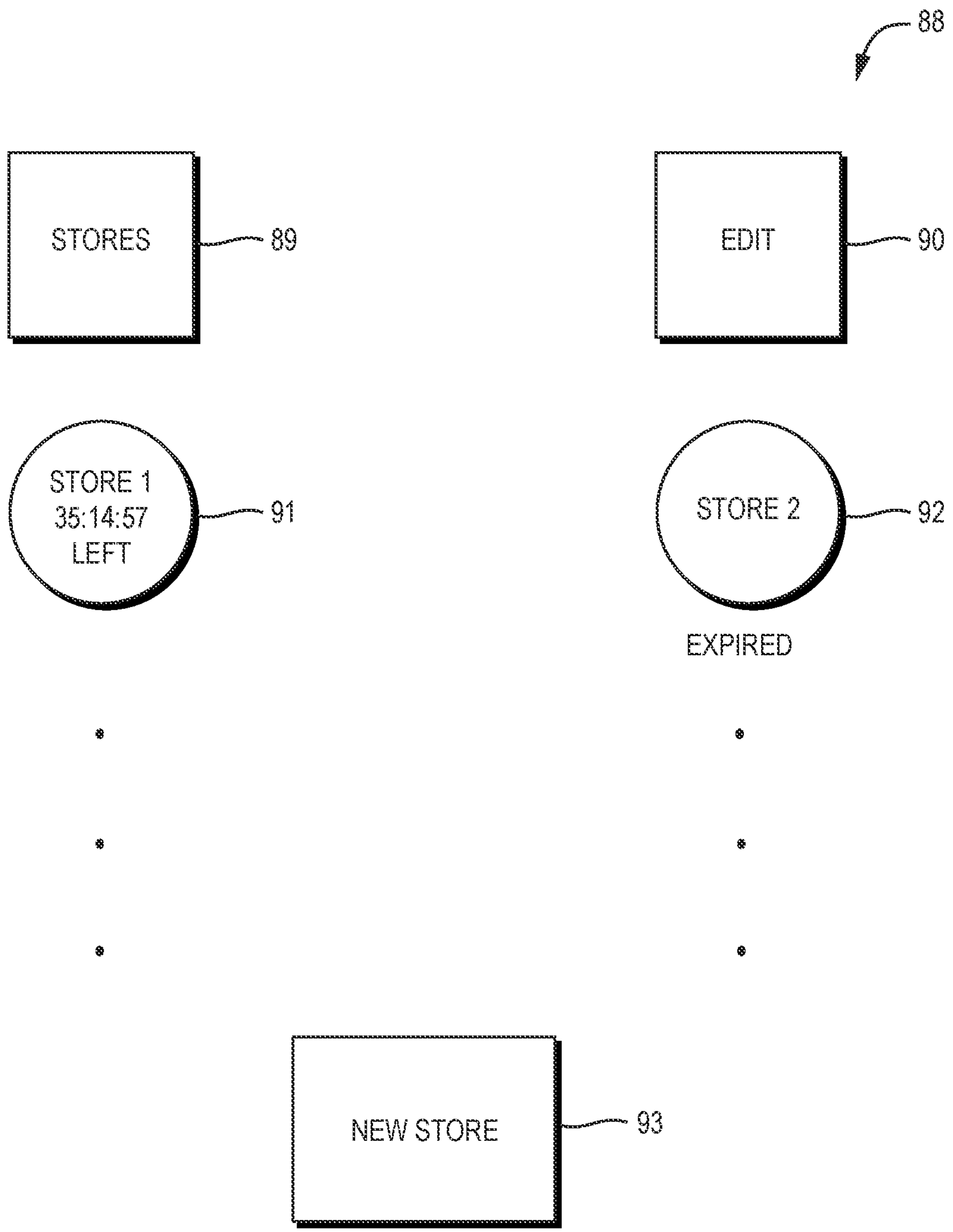
FIGS. 4A and 4B illustrate device display screens during creation of a new virtual store.
Figure 4B:
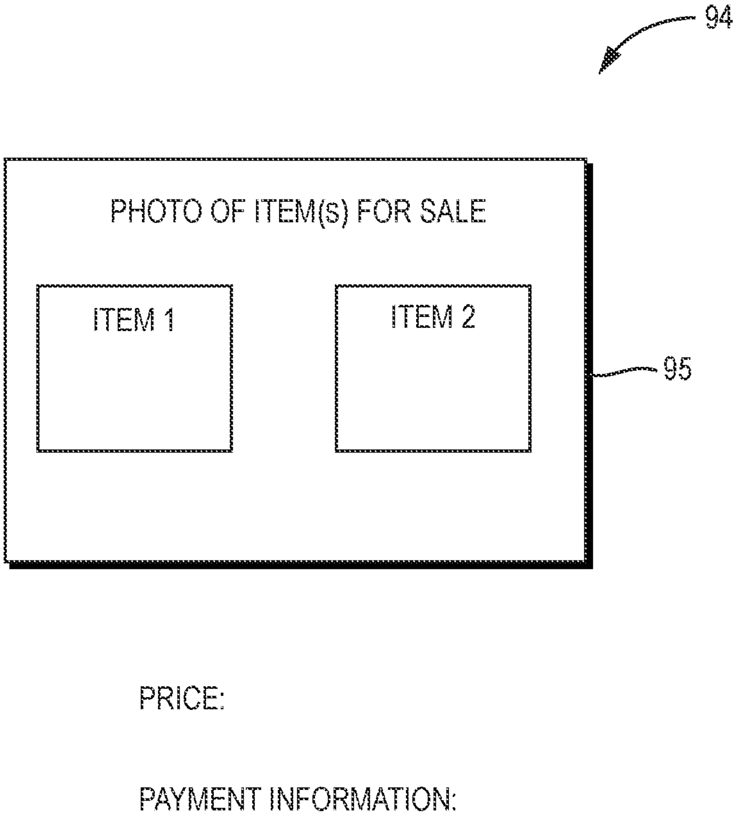

FIG. 3 is a flowchart of operation 70 of the subject virtual store creation and use app. FIGS. 4A-4B illustrate exemplary, non-limiting device display screens that illustrate some of the steps. Operation 70 contemplates either a new user (seller), or an existing seller who is creating a new store. The server first provides a "new store" screen 88, FIG. 4A, for display on the user's smartphone or other device, step 72. Screen 88 includes button 89 to select stores and button 90 to edit the stores, as well as "new store" button 93. The screen also shows previously-opened stores (91 and 92) and indicates information such as if stores are expired and when they will be expiring (e.g., store 91 has about one and one-half days (35:14:57) left before it expires). The screen includes a "New Store" button 93 that the user can tap to create a new store. The next screen, step 74, provides a means for the user to select an image, video, or scene (e.g., a button to tap to pick a photo and then an exploration of the device to locate the image, video, or scene), and once the selection is made, a "save" button that causes the selection to be stored in the cloud server and on the device. The app assigns a UUID that is associated with the saved visible representation. The user is then prompted to trace closed shapes around each item in the visible representation that is to be offered for sale, and tracing and display of the traced lines/the enclosed area is enabled by the app, step 78. The technical way that this can work in one example is that the store has an associated image. The items for sale have associated shapes (and size information of that shape). That shape/size information is used to crop the image in real-time to create the "thumbnails" for the sale item, as well as to create the highlighted shapes.

Entry of pricing and any other item-specific details (such as a description, quantity, etc.) for each selected item is then enabled, step 80. See screen 94, FIG. 4B, which shows a photo 95 with one or more items for sale, along with pricing information entered by the seller and payment information. Once the item has been selected and the item details entered, the seller elects to save them as a virtual store. Step 80 also includes entry of payment options. The visible representation, the UUID, the pricing/details, and the selected payment options are then saved to the cloud server as a group, step 82. In other words, they are saved along with an association among them that will allow them to remain associated. The server is preferably a cloud server such as those available from AWS. The server includes a database that holds copies of the data. All of the logic for the virtual store creation and use is handled by the app. There is no component on the server that handles any processing or runs any logic. The app then enables the seller to make the newly-created store live by displaying an "open my store" button that can be tapped. In response the app creates a URL for the virtual store, step 84. The URL (and in some cases the saved visible representation) is then provided to the seller, step 86. If the store has an expiration time, the time remaining can also be displayed. The seller is then able to distribute the URL (and the visible representation if desired) to others who may desire to purchase items, as was described above. For example, the URL can be distributed via text or the like. Note that while the steps are illustrated in a particular order, the order of the steps can be changed or mixed.

In an example the app is further enabled to output, as an electronic display or a printout, a matrix barcode that when scanned is configured to cause the purchase of an item listed for sale in a "single item, auto add to cart" operation. In an example the app enables a potential purchaser of an item listed for sale to view multiple store offerings from multiple vendors at the same time, each store displaying one or more items listed for sale.

Figure 5:
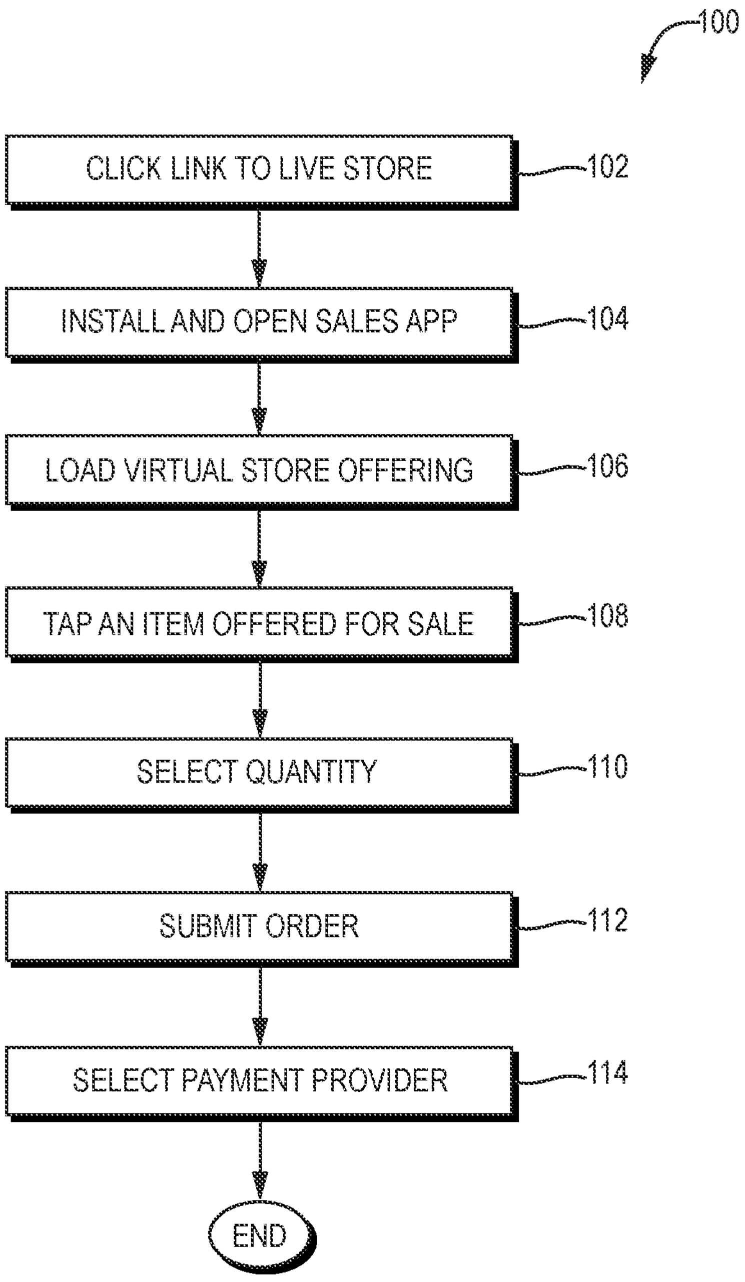
FIG. 5 is a flowchart of the buyer's workflow.
Figure 6:
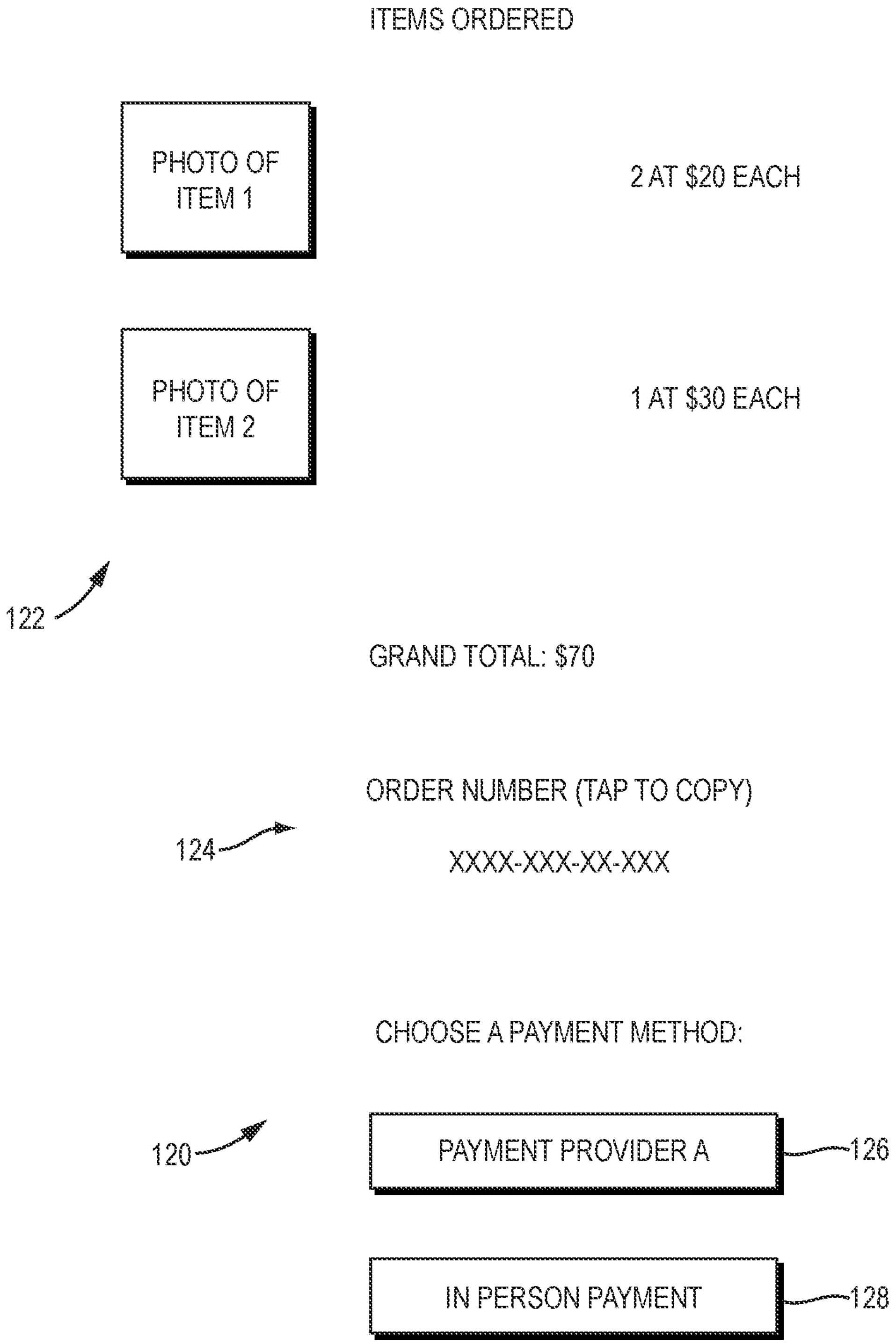
FIG. 6 illustrates a device screen during purchase of an item from a virtual store.

FIG. 5 is a flowchart of the buyer's workflow 100, accomplished using smartphone or equivalent device 16. Device 16 needs to be able to communicate over the cloud with at least server 12, and needs to be touch-enabled or otherwise responsive to a finger or hand gesture/motion, or responsive to a controller or other pointing or input device. FIG. 6 illustrates an exemplary, non-limiting device display screen that illustrates some of the steps. The link/URL provided in step 86, FIG. 3, is clicked, step 102. If the buyer does not have the sales app it is retrieved from the app store 20. The "sales app" is then opened, step 104. The store offering (virtual store) is then loaded, step 106. The buyer can then tap an item to be purchased and select a quantity, steps 108 and 110. The selection is then added to the cart. The order is then submitted, step 112. A payment provider is then selected, step 114. Information is entered, step 110. The order is then submitted, step 112. FIG. 6 illustrates areas 120 and 122 that include photos of items for sale and the selected quantities and pricing, along with a grand total due. There is an order number 124 assigned, that can be tapped to copy so it can be sent e.g., via text. Payment option buttons 126 and 128 are provided. Note that while the steps are illustrated in a particular order, the order of the steps can be changed or mixed.

The store app allows sellers to create and launch a virtual store entirely on their phone. No login or monthly fee is required. The store can be established by the seller selecting an image, video, or scene, drawing closed shapes around product(s) that are to be offered for sale, assigning a price and other details to each product, then selecting preferred or allowable payment methods. A URL and the image are then made available for sharing across any social media account, email, newsletter, or group chat, for example. Users (buyers) can then load the store (with no login required), tap the items they want, and checkout. The buyer can then pay using the payment options provided by the seller. The commercial transaction takes place directly between the seller and buyer without any involvement by the app.

Following is a specific, non-limiting example of the operation of the sales app when a store is setup (SellerFlow), when a store is shared (ShareFlow) and when an item is purchased (BuyerFlow).

Note that the app generates all of the UUIDs. The only thing not in the app is the cloud storage of the data: copies of the images as files, and a GraphQL database that holds copies of the data. There is no business logic outside the app. There is no server "app" component that does any processing or runs any logic.

SellerFlow-1: The user decides to tap the 'New Store' button.

SellerFlow-2: The app asks the user to pick an image from their photo library.

SellerFlow-3: As the image is chosen, the app logic creates a unique name derived from a UUID value of say 49D839AC-58CC-4F23-BFDC-E78161805C68. (iOS and Android SDKS have standard UUID generators that guarantee unique IDs). The selected image is saved in the cloud and named: 49D839AC-58CC-4F23-BFDC-E78161805C68. A new record (with a primary ID value of 49D839AC-58CC-4F23-BFDC-E78161805C68) is created in the Store table in the AWS GraphQL Database.

SellerFlow-4: As the user draws a shape, the app assigns that shape a new and different UUID value of say C273A6AA-5A46-42C8-9849-886ACFC36540.

SellerFlow-5: The app immediately asks the user for a price (and in some cases other details such as quantity and item description) of the new item. When the user taps "Save", the app will create a new record (with the ID value of C273A6AA-5A46-42C8-9849-886ACFC36540) in the Item table in AWS to save the blueprint for the new Item, such as position, size, price, etc., and in that same record the app saves a back reference to the Store with the value 49D839AC-58CC-4F23-BFDC-E78161805C68 (which links the item to the Store).

SellerFlow-6: The app shows the Item record. The Item's "thumbnail" image is cropped in real time from the image using the "blueprint" data found in the Item record. When the user has completed repeating steps SellerWorkflow-4 and SellerWorkflow-5 for each item in the image, they tap "Done."

SellerFlow-7: The user (who is going to be the seller) can enter their payment option information for the appropriate payment providers. They can also elect to accept "In Person" payments to accept local currency. When the seller taps "Open my Store!" the app then creates a UUID for each payment option, and uses that UUID to create a record in the Payment Option table of the AWS database with backreferences to the Store 49D839AC-58CC-4F23-BFDC-E78161805C68. The app then updates the Store record to reflect the Store status is now open, adds an expiration criterion (midnight the next day by default, a selected date by the user, cap of orders (unpaid), cap of paid orders, etc.) and overwrites the database entry for the Store record with the ID of 49D839AC-58CC-4F23-BFDC-E78161805C68.

SellerFlow-8: The app has "Share" and "Copy" buttons, so the user can tap those to share the store with people. Since the app knows the Store's UUID value of 49D839AC-58CC-4F23-BFDC-E78161805C68, it has logic that says, "The user wants to share this Store with people so those people can buy from it." The app has a hard coded string to which it appends the UUID the user wants to share, to create the URL for the current Store.

ShareFlow-1: The seller shares the link to the world. A buyer sees it and can share it with others. It's not just sellers that can share the link. A buyer then taps that link.

BuyerFlow-1: The app intercepts the link (using a technology called deep-linking, universal links, etc.). The app logic sees the "buy" string in the URL and knows to use the UUID that follows it to ask the AWS framework to fetch the image named 49D839AC-58CC-4F23-BFDC-E78161805C68 and to fetch the Store and Item records tied to the Store UUID value of 49D839AC-58CC-4F23-BFDC-E78161805C68. The framework fetches as desired and one of two actions occurs based upon the data:

(1) If the store is expired (due to any criteria set by the user or manually expired by the seller or due to content moderation by the app provider), the app (even though it has the full store data), will instead show a simple "Sorry, store is no longer available" screen message and the buyer cannot see the store, much less make a purchase.

(2) If the store is not expired (i.e., is still live) the app generates the store on the fly via custom app logic that uses the database records and the associated image as the blueprint for the Store to show on the screen.

BuyerFlow-2: The user taps on an Item shape in the image. The app shows the pricing details and allows the user to order as many items as they would like. When the user taps, "Add to Cart" the app creates a new UUID value of say 3358A682-BB2C-4665-BF39-B85B5298BA1F to assign to this order. The app uses the AWS framework to create a record in the Order table that has a backreference to the Store value of 49D839AC-58CC-4F23-BFDC-E78161805C68. The app does the same thing for a record in the Order Item table. This item will denote quantity, etc. and have a back reference to the Item value of C273A6AA-5A46-42C8-9849-886ACFC36540 and Order value of 3358A682-BB2C-4665-BF39-B85B5298BA1F.

BuyerFlow-3: The app then adds the item to the cart, reflected in the list under the store image.

BuyerFlow-4: The buyer shops until all items and desired quantities are entered. The buyer then taps "Send Order". This will update the entry with ID 3358A682-BB2C-4665-BF39-B85B5298BA1F in the Order table in the AWS Database with updated information to demonstrate the Order is now submitted.

BuyerFlow-5: The user can see the order number now on screen (e.g. 3358A682-BB2C-4665-BF39-B85B5298BA1F. They can tap it to copy it (e.g., to send to the seller if needed) or enlarge it for easier reading at a distance. They can then choose a payment method they'd like to use. In this case, the app shows the two choices the seller has offered. The buyer selects one. When the buyer does so, the app updates the 3358A682-BB2C-4665-BF39-B85B5298BA1F record in the Order table to denote which payment option was chosen (so the seller can know where to look for payment details). The buyer then pays for their order outside the app. The app never sees or processes any payment transactions.

BuyerFlow-6: The app highlights which payment option was chosen, to remind the buyer. This is so they too will know where to look to see if they paid.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method for developing a virtual store for one or more items to be listed for sale on the virtual store, comprising:

selecting, by a seller of an item, a visible representation that depicts a plurality of items;

automatically, by a software application running on a computing device, assigning a first unique identifier to the selected visible representation;

automatically, by the software application running on the computing device, saving, to a server, the selected visible representation in association with the first assigned unique identifier;

selecting, by receiving a tracing operation on a screen of the computing device, one or more items to be listed for sale from the plurality of depicted items in the selected visible representation, wherein receiving the tracing operation causes a second unique identifier of a closed shape of the tracing operation to be assigned to the selected one or more items;

associating, by the seller, at least pricing with the one or more items to be listed for sale;

identifying, by the seller, one or more payment options;

automatically, by the software application running on the computing device, assigning a third unique identifier for the one or more payment options, wherein the third unique identifier is associated with payment processing information for completing a transaction for the one or more items;

in response to receiving selection by the seller of an icon on the screen of the computing device, storing, at the server and as an associated group record, at least the visible representation, the pricing, the payment options, and the first, second and third unique identifiers, wherein the associated group record links (i) the first unique identifier to the visible representation, (ii) the second unique identifier to the one or more items via the shape data, and (iii) the third unique identifier to the payment options, such that the associated group record is usable to render the virtual store and enable selection and purchase of the one or more items, wherein the associated group represents a virtual store;

automatically, by the software application running on the computing device, developing a uniform resource locator (URL) for the virtual store, wherein the URL is generated based on the first unique identifier; and causing, in response to the selection of the URL, display of the virtual store on an accessing device by:

retrieving the associated group record using the first unique identifier;

causing, in response to the retrieving the group record and based on the second unique identifier, at least one item image having a shape corresponding to the closed shape of the assigned second unique identifier to be rendered in the virtual store, wherein the at least one item image having the closed shape is configured to function as a selectable region that causes initiation of a transaction using the one or more payment options associated with the unique identifier;

in response to receiving a selection of the at least one item image from the accessing device, initiating a transaction with the accessing device using the one or more payment options associated with the third unique identifier.

2. The method of claim 1, further comprising selecting, by the seller and before the selection of the visible representation, an option to create a new store.

3. The method of claim 1, wherein selecting, by the seller, a visible representation that includes the item, comprises tapping an image, a video, or a scene, on the computing device.

4. The method of claim 3, wherein the scene comprises an augmented reality (AR) scene, a virtual reality (VR) scene, or an x reality (XR) scene.

5. The method of claim 4, wherein selecting, by the seller, a visible representation that includes the item, comprises using a controller, or a hand or finger detection process.

6. The method of claim 1, wherein the identifier comprises a Universally Unique Identifier (UUID), wherein at least one of the first unique identifier, the second unique identifier, or the third unique identifier comprises a Universally Unique Identifier (UUID).

7. The method of claim 1, wherein selecting from the visible representation one or more items to be listed for sale is accomplished by the seller.

8. The method of claim 7, wherein selecting from the visible representation one or more items to be listed for sale is accomplished by the seller tracing on a screen of the computing device.

9. The method of claim 8, wherein selecting from the visible representation one or more items to be listed for sale is accomplished by the seller tracing a closed shape on the computing device screen.

10. The method of claim 9, wherein the seller can select multiple separate items that are in the visible representation by tracing closed shapes around each of the multiple separate items.

11. The method of claim 10, wherein associating, by the seller, pricing with the selected items comprises separately assigning prices to each of the multiple separate items.

12. The method of claim 1, further comprising choosing for purchase from the visible representation, by a purchaser, and after selection of the URL and display of the virtual store, an item listed for sale.

13. The method of claim 12, wherein choosing an item for purchase comprises tapping, by the purchaser, a visible representation of the item on a display of the computing device.

14. The method of claim 13, further comprising purchasing the item for purchase, by the purchaser, by selecting a payment option from the one or more payment options.

15. The method of claim 1, further comprising enabling a potential purchaser of an item listed for sale to view multiple virtual stores from one or multiple vendors at the same time, each virtual store displaying one or more items listed for sale.

16. The method of claim 1, further comprising identifying, by the seller, a criterion by which the virtual store will automatically expire.

* * * * *